US008274449B2

(12) United States Patent
Huang et al.

(10) Patent No.: US 8,274,449 B2
(45) Date of Patent: Sep. 25, 2012

(54) DATA ACCESS METHOD FOR A TIMING CONTROLLER OF A FLAT PANEL DISPLAY AND RELATED DEVICE

(75) Inventors: Po-Jui Huang, Hsinchu County (TW); Ying-Jie Su, Hsinchu (TW); Chung-Jr Jan, Taipei County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 878 days.

(21) Appl. No.: 12/188,221

(22) Filed: Aug. 8, 2008

(65) Prior Publication Data

US 2009/0278767 A1 Nov. 12, 2009

(30) Foreign Application Priority Data

May 7, 2008 (TW) ............................... 97116805 A

(51) Int. Cl.
*G09G 3/20* (2006.01)
*G09G 5/39* (2006.01)
*G06F 13/00* (2006.01)

(52) U.S. Cl. ............. 345/55; 345/530; 345/534; 345/56

(58) Field of Classification Search .................... 345/55, 345/500
See application file for complete search history.

(56) References Cited

U.S. PATENT DOCUMENTS 5,867,140 A * 2/1999 Rader ............................. 345/98
6,151,011 A * 11/2000 Worley et al. ................. 345/692
6,307,651 B1 * 10/2001 Ohtani et al. ................. 358/524
6,313,844 B1 * 11/2001 Yamashita ..................... 345/531
6,573,928 B1 * 6/2003 Jones et al. ...................... 348/51
6,657,621 B2 * 12/2003 Staudacher ................... 345/204
6,925,543 B2 * 8/2005 Takahashi et al. ............ 711/170
7,027,060 B2 * 4/2006 Suh et al. ...................... 345/544
7,139,022 B1 * 11/2006 Raffy ............................ 348/273
7,170,522 B2 * 1/2007 Yamaura ....................... 345/560
7,623,133 B1 * 11/2009 de Waal et al. ............... 345/545
7,652,645 B2 * 1/2010 Park et al. ....................... 345/76
7,667,718 B2 * 2/2010 Hsu et al. ...................... 345/668
7,773,048 B2 * 8/2010 Shiraishi ........................ 345/1.1
2003/0081680 A1 * 5/2003 Rathnam et al. ......... 375/240.16
2003/0085865 A1 * 5/2003 Lee et al. ........................ 345/98
2003/0117489 A1 * 6/2003 Jones et al. ..................... 348/51
2003/0197707 A1 * 10/2003 Dawson ........................ 345/543
2004/0100472 A1 * 5/2004 Linzer et al. .................. 345/536
2004/0140978 A1 * 7/2004 Suh et al. ...................... 345/544
2006/0022912 A1 * 2/2006 Park et al. ....................... 345/76
2006/0109339 A1 * 5/2006 Chao et al. ................. 348/14.01

(Continued)

*Primary Examiner* — Amare Mengistu
*Assistant Examiner* — Sarvesh J Nadkarni
(74) *Attorney, Agent, or Firm* — Winston Hsu; Scott Margo

(57) ABSTRACT

A data access method for a timing controller of a flat panel display includes forming a line buffer including a plurality of memory cells in the timing controller, dividing the plurality of memory cells into a first section and a second section, wherein the number of memory cells in the first section is greater than the number of memory cells in the second section, writing a first number of pixel data into the first section, wherein the first number of pixel data is included in a plurality of pixel data corresponding to a row of a frame, writing a second number of pixel data into the second section, wherein the second number of pixel data is included in the plurality of pixel data, and the first number is equal to the second number, and reading the plurality of pixel data from the plurality of memory cells according to an order.

13 Claims, 5 Drawing Sheets

U.S. PATENT DOCUMENTS

| | | | | |
|---|---|---|---|---|
| 2006/0145974 | A1* | 7/2006 | Willis et al. | 345/84 |
| 2007/0057883 | A1* | 3/2007 | Cho et al. | 345/88 |
| 2007/0080969 | A1* | 4/2007 | Yamaura | 345/535 |
| 2007/0236511 | A1* | 10/2007 | Molloy | 345/634 |
| 2007/0263005 | A1* | 11/2007 | Huang et al. | 345/546 |
| 2007/0268233 | A1* | 11/2007 | Hashimoto et al. | 345/100 |
| 2008/0094342 | A1* | 4/2008 | Kim | 345/99 |
| 2008/0224978 | A1* | 9/2008 | Park | 345/92 |
| 2011/0134134 | A1* | 6/2011 | Yoshitake | 345/545 |

* cited by examiner

DATA ACCESS METHOD FOR A TIMING CONTROLLER OF A FLAT PANEL DISPLAY AND RELATED DEVICE

BACKGROUND OF THE INVENTION

1. Field of the Invention

The present invention relates to a data access method for a timing controller of a flat panel display and a related device, and more particularly, to a data access method and a related device for reducing memory cells of a line buffer in the timing controller, for saving memory cost for displaying images.

2. Description of the Prior Art

The advantages of a liquid crystal display (LCD) include lighter weight, less electrical consumption, and less radiation contamination. LCD monitors have been widely applied to various portable information products, such as notebooks, mobile phones, PDAs (Personal Digital Assistants), etc. In an LCD monitor, incident light produces different polarization or refraction effects when the alignment of liquid crystal molecules is altered. The transmission of the incident light is affected by the liquid crystal molecules, and thus magnitude of the light emitted from the liquid crystal molecules varies. The LCD monitor utilizes the characteristics of the liquid crystal molecules to control the corresponding light transmittance and produces gorgeous images according to different magnitudes of red, blue, and green light.

Please refer to FIG. 1. FIG. 1 is a schematic diagram of a TFT LCD device 10 according to the prior art. The TFT LCD device 10 includes a panel 100, a timing controller 102, a data-line-signal output circuit 104 and a scan-line-signal output circuit 106. The data-line-signal output circuit 104 transforms data signals into voltage signals according to related control signals generated by the timing controller 102. The scan-line-signal output circuit 106 controls output states of the voltage signals according to related control signals generated by the timing controller 102, so as to control a potential difference of an equivalent capacitor of each pixel of the panel 100 for grayscale display. In addition, a frame of an image is displayed by rows. As shown in FIG. 1, a row of a frame corresponds to 2N pixel data $P_1$-$P_{2N}$, and the 2N pixel data is outputted to the panel 100 via the two port data-line-signal output circuit 104. That is, the TFT LCD device 10 displays the pixel data $P_1$ and $P_{N+1}$ at the same time, and then displays the pixel data $P_2$ and $P_{N+2}$ at the same time, and so on.

In fact, the original 2N pixel data $P_1$-$P_{2N}$ does not line up according to a displaying order of $P_1$, $P_{N+1}$, $P_2$, $P_{N+2}$ . . . , $P_N$, and $P_{2N}$. A line buffer 110 located in the timing controller 102 is utilized for transforming an original order of $P_1$, $P_2$ . . . , $P_{N-1}$, and $P_N$ to the displaying order of $P_1$, $P_{N+1}$, $P_2$, $P_{N+2}$ . . . , $P_N$, and $P_{2N}$, and outputting to the two port data-line-signal output circuit 104. Please refer to FIG. 2 for a schematic diagram of the pixel data $P_1$-$P_{2N}$ and the line buffer 110. The line buffer 110 includes N memory cells, wherein each cell is used for storing two adjacent pixel data. Therefore, the line buffer 110 can be used for storing the 2N pixel data $P_1$-$P_{2N}$. When the pixel data $P_1$, $P_2$ . . . , $P_N$, and $P_{N+1}$ are written into the line buffer 110, the pixel data $P_1$ and $P_{N+1}$ are read out from the line buffer 110 and outputted to the data-line-signal output circuit 104. Similarly, when the pixel data $P_{N+2}$ are written into the line buffer 110, the pixel data $P_2$ and $P_{N+2}$ are read out from the line buffer 110 and outputted to the data-line-signal output circuit 104.

However, each memory cell of the line buffer 110 is used for being written and read only once, which cannot enhance the efficiency of memory cells.

SUMMARY OF THE INVENTION

It is therefore a primary objective of the claimed invention to provide a data access method for a timing controller of a flat panel display and a related device, for saving memory cost for displaying images.

The present invention discloses a data access method for a timing controller of a flat panel display, which comprises forming a line buffer including a plurality of memory cells in the timing controller, dividing the plurality of memory cells into a first section and a second section, wherein the number of memory cells in the first section is greater than the number of memory cells in the second section, writing a first number of pixel data into the first section, wherein the first number of pixel data is included in a plurality of pixel data corresponding to a row of a frame, writing a second number of pixel data into the second section, wherein the second number of pixel data is included in the plurality of pixel data corresponding to the row of the frame, and the first number is equal to the second number, and reading the plurality of pixel data from the plurality of memory cells according to an order.

The present invention further discloses a flat panel display for saving memory cells for displaying images. The flat panel display comprises a panel, a data-line-signal output circuit, a scan-line-signal output circuit, and a timing controller. The data-line-signal output circuit is coupled to the panel and is utilized for outputting pixel data of images. The scan-line-signal output circuit is coupled to the panel and is utilized for driving the panel to display the images. The timing controller is coupled to the data-line-signal output circuit and the scan-line-signal output circuit and comprises a line buffer, a control unit and a data packing unit. The line buffer includes a plurality of memory cells, wherein the plurality of memory cells is divided into a first section and a second section, and the number of memory cells in the first section is greater than the number of memory cells in the second section. The control unit is coupled to the line buffer and is utilized for writing a first number of pixel data into the first section and writing a second number of pixel data into the second section, wherein the first number of pixel data and the second number of pixel data are included in a plurality of pixel data corresponding to a row of a frame. The data packing unit is coupled to the control unit and is utilized for reading the plurality of pixel data from the plurality of memory cells according to an order and outputting the plurality of pixel data to the data-line-signal output circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
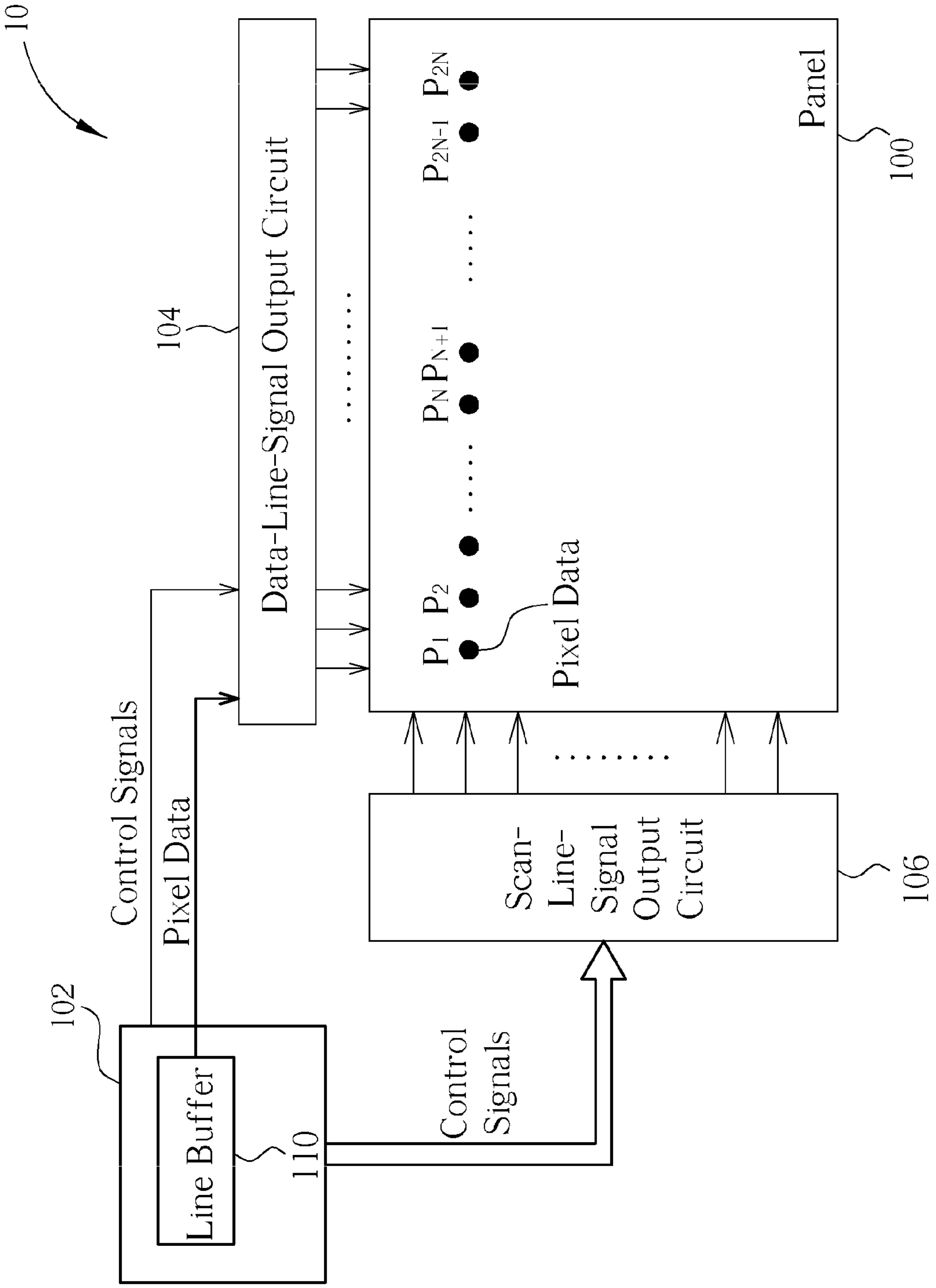
FIG. 1 PRIOR ART
FIG. 1 is a schematic diagram of a TFT LCD device according to the prior art.
Figure 2:
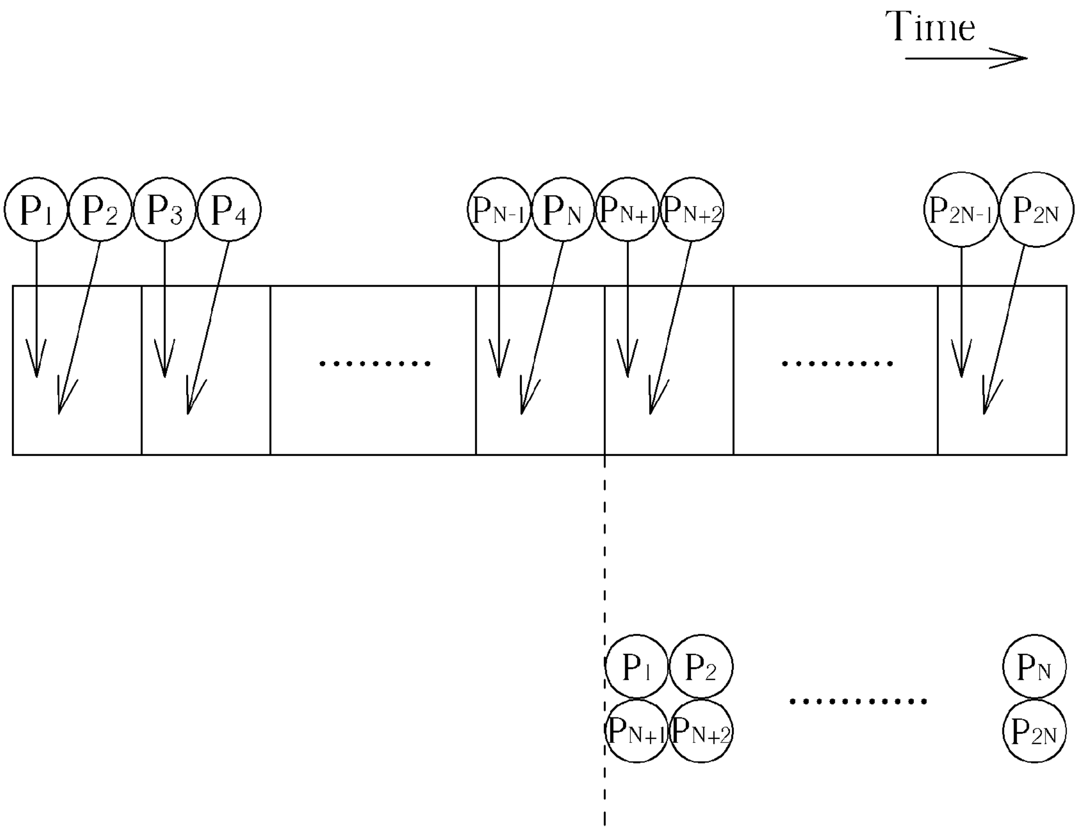
FIG. 2 PRIOR ART
FIG. 2 is a schematic diagram of the pixel data $P_1$-$P_{2N}$ and a buffer shown in FIG. 1.
Figure 3:
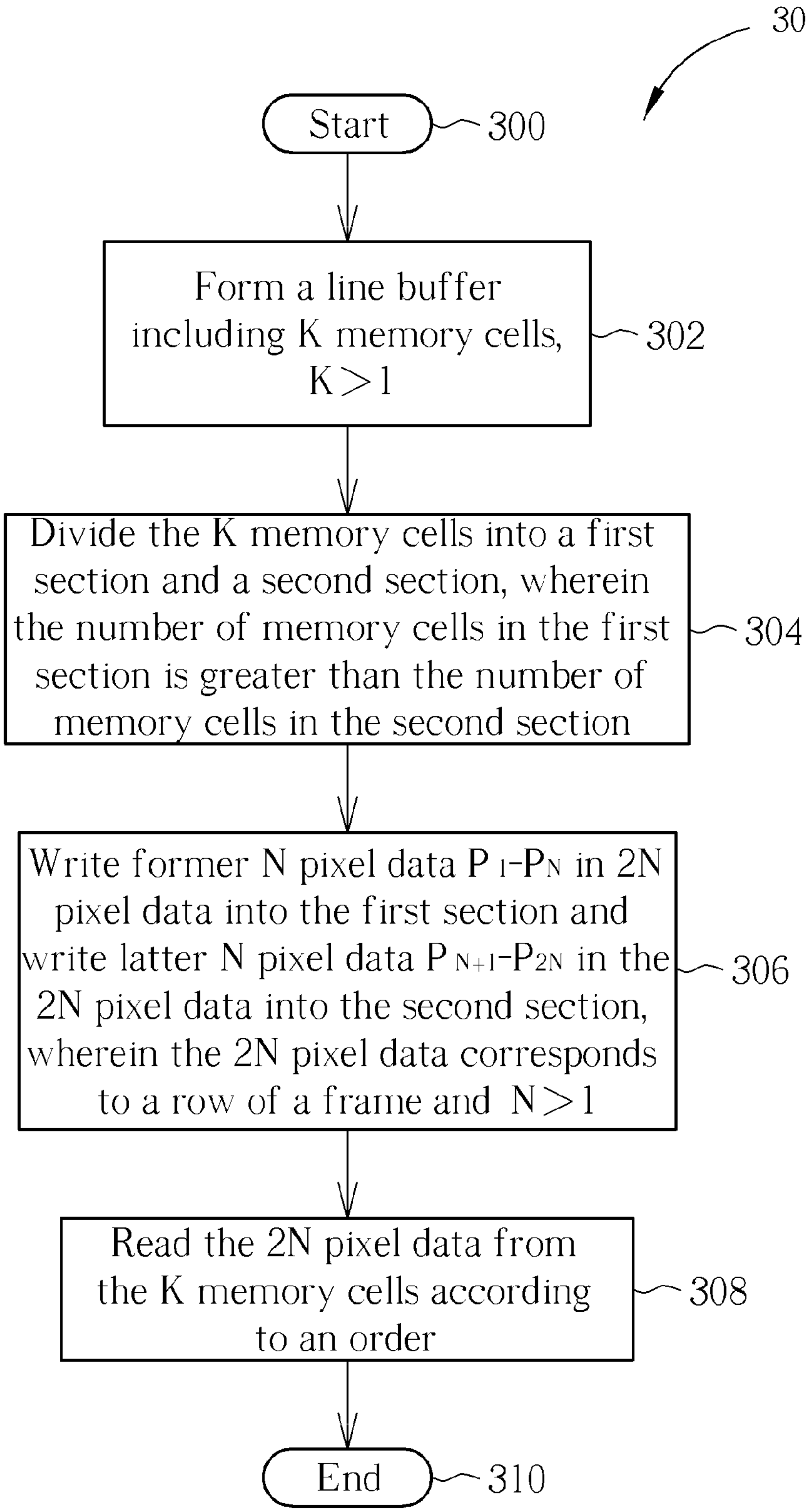
FIG. 3 is a flowchart of a process according an embodiment of the present invention.

Please refer to FIG. 3, which is a flowchart of a process 30 according an embodiment of the present invention. The process 30 is utilized for a line buffer in a timing controller of a flat panel display, for saving memory cost. The process 30 comprises the following steps:

Step 300: Start.

Step 302: Form a line buffer including K memory cells, K>1.

Step 304: Divide the K memory cells into a first section and a second section, wherein the number of memory cells in the first section is greater than the number of memory cells in the second section.

Step 306: Write former N pixel data $P_1$-$P_N$ in 2N pixel data into the first section and write latter N pixel data $P_{N+1}$-$P_{2N}$ in the 2N pixel data into the second section, wherein the 2N pixel data corresponds to a row of a frame and N>1.

Step 308: Read the 2N pixel data from the K memory cells according to an order.

Step 310: End.

In the process 30, the pixel data $P_1$-$P_N$ correspond to a former half of the row of the frame and are written into the first section; and the pixel data $P_{N+1}$-$P_{2N}$ correspond to a latter half of the row into the second section and are written into the second section. The number of memory cells in the first section is greater than the number of memory cells in the second section. Therefore, the memory cells in the second section are used for being written and read at least twice for outputting the pixel data $P_{N+1}$-$P_{2N}$. Note that, the word "former" or "latter" used as above means the output timing of the pixel data.

In the step 306, the step of writing the pixel data $P_1$-$P_N$ into the first section involves writing every pair of the pixel data $P_1$-$P_N$ into a corresponding memory cell in the first section. Similarly, the step of writing the pixel data $P_{N+1}$-$P_{2N}$ into the second section involves writing every pair of the pixel data $P_{N+1}$-$P_{2N}$ into a corresponding memory cell in the second section. Note that, the pixel data $P_1$-$P_{2N}$ is outputted to a two port data-line-signal output circuit of the flat panel display. Next, in the step 308, the step of reading the 2N pixel data from the K memory cells according to an order is reading the pixel data $P_1$ and $P_{N+1}$ from a corresponding memory cell at the same time, and then reading the pixel data $P_2$ and $P_{N+2}$ from a corresponding memory cell at the same time, and so on.

Preferably, as a result of the number of memory cells in the first section being greater than the number of memory cells in the second section, the pixel data $P_{N+1}$-$P_{2N}$ is further divided into two portions with the same number of pixel data, a former portion $P_{N+1}$-$P_{3N/2}$ and a latter portion $P_{(3N/2)+1}$-$P_{2N}$. The pixel data $P_{N+1}$-$P_{3N/2}$ are written into the memory cells in the second section by every pair of the pixel data, and the pixel data $P_{(3N/2)+1}$-$P_{2N}$ are also written into the memory cells in the second section by every pair of the pixel data. From the above, it is derived that a number of the memory cells of the first section is N/2; a number of the memory cells of the second section is N/4; and the number K of the memory cells of the line buffer is equal to N/2+N/4=3N/4.

In the prior art, the 2N pixel data corresponding to a row of a frame are stored in N memory cells. In comparison, the process 30 makes the 2N pixel data corresponding to a row of a frame being stored in 3N/4 memory cells. That is, the embodiment of the present invention saves ¼ number of memory cells. Note that, the embodiment of the present invention is utilized for writing and reading pixel data corresponding to a row of a frame. The embodiment of the present invention can be used for writing and reading pixel data for displaying a frame.

Figure 4:
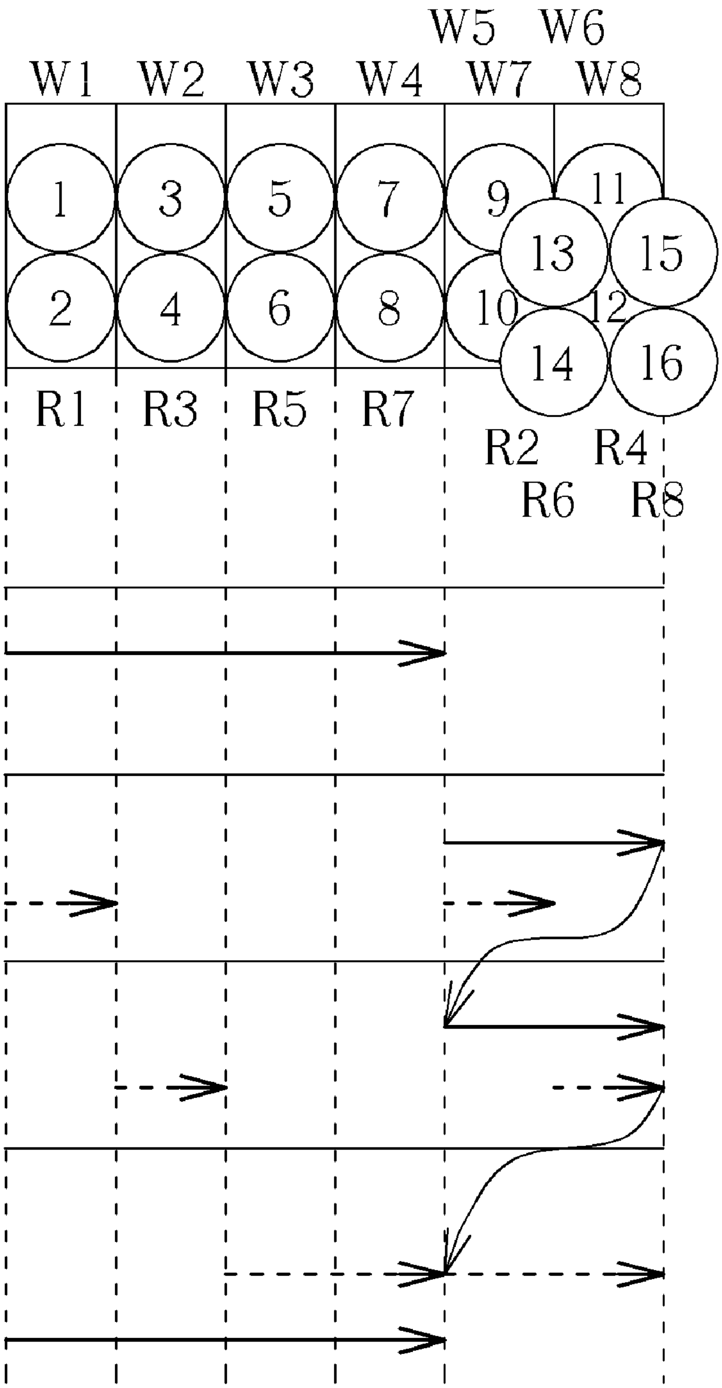
FIG. 4 is a timing diagram of the process shown in FIG. 3 for writing and reading 16 pixel data.

As to the order for writing the 2N pixel data into the line buffer and reading the 2N pixel data from the line buffer, please refer to FIG. 4. FIG. 4 is a timing diagram of the process 30 for writing and reading 16 pixel data. The 16 pixel data $P_1$-$P_{16}$ corresponds to a row of a frame and are written into a line buffer including (¾)×8=6 memory cells. Hard lines represent writing actions; dashed lines represent reading actions; W1-W8 represent the writing order of the pixel data; and R1-R8 represent the reading order of the pixel data. In FIG. 4, for example, the pixel data $P_7$ and $P_8$ correspond to W4 and R7 that means that the pixel $P_7$ and $P_8$ are the 4th in the writing order and the 7th in the reading order. Note that, the pixel data $P_9$-$P_{12}$ and $P_{13}$-$P_{16}$ are written into the same memory cells respectively for saving memory cells, so that the pixel data $P_9$-$P_{12}$ have to be read out before the pixel data $P_{13}$-$P_{16}$ being written. From the above, a writing and reading order of the 16 pixel data is: W1→W2→W3→W4→R1→W5→R2→W6→R3→W7→R4→W8→R5→R6→R7→R8. Moreover, the process 30 is further utilized for displaying a frame. The writing and reading order of the pixel data for a present row, a previous row and a next row is: . . . R5'→W1→R6'→W2→R7'→W3→R8'→W4→R1→W5→R2→W6→R3→W7→R4→W8→R5→W1"→R6→W2"→R7→W3"→R8→W4"→ . . . , wherein R5'-R8' represent the reading order of the pixel data corresponding to the previous row, and W1"-W4" represent the writing order the pixel data corresponding to the next row.

Figure 5:
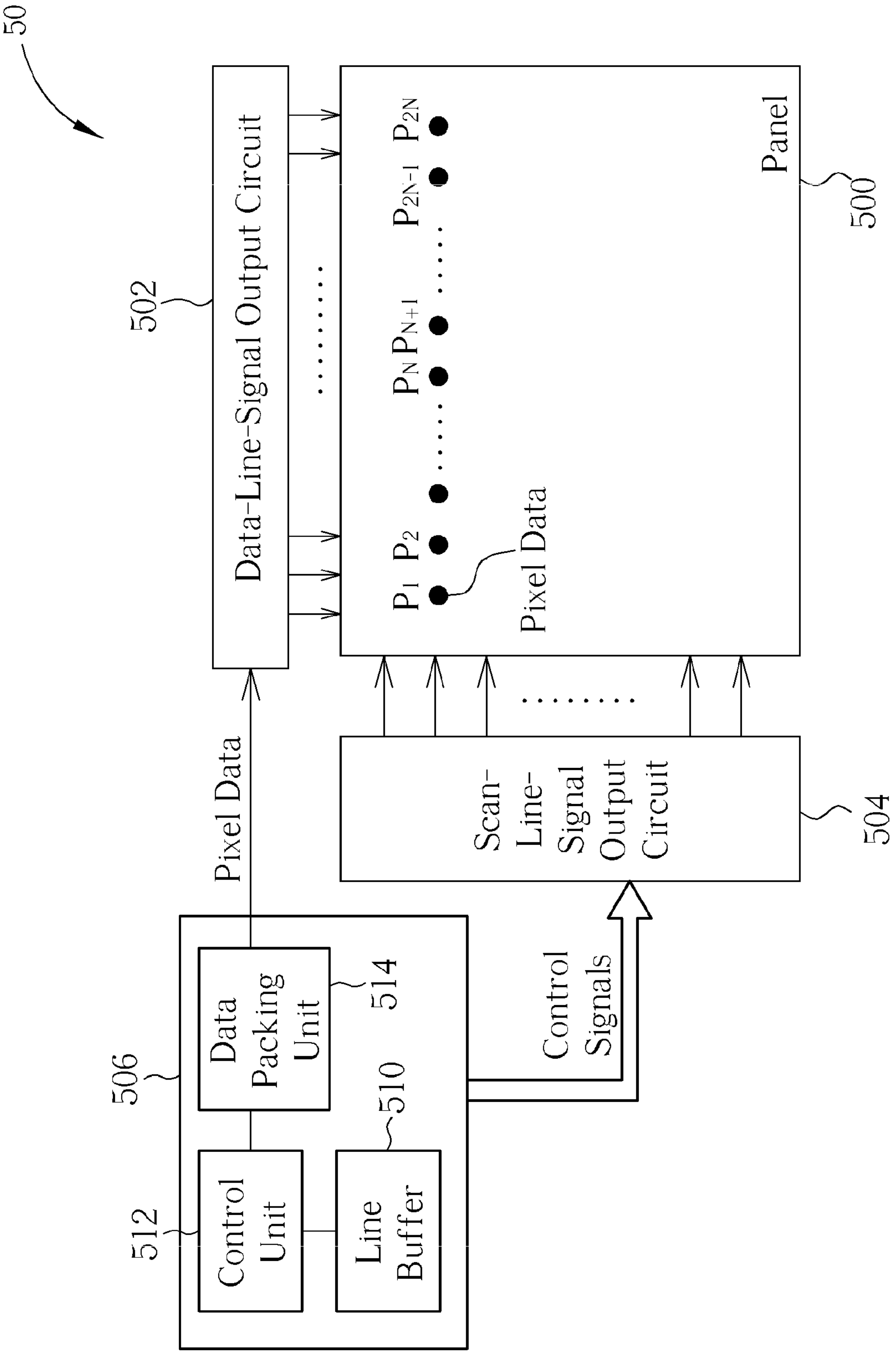
FIG. 5 is a schematic diagram of a flat panel display according to an embodiment of the present invention.

Please refer to FIG. 5, which is a schematic diagram of a flat panel display 50 according to an embodiment of the present invention. The flat panel display 50 uses the process 30 to transform an original order of pixel data to a displaying order of the pixel data, for saving memory cost for displaying images. The flat panel display 50 comprises a panel 500, a data-line-signal output circuit 502, a scan-line-signal output circuit 504 and a timing controller 506. The data-line-signal output circuit 502 is coupled to the panel 500 and is utilized for outputting the pixel data of the images. The scan-line-signal output circuit 504 is coupled to the panel 500 and is utilized for driving the panel to display the images. The timing controller 506 is coupled to the data-line-signal output circuit 502 and the scan-line-signal output circuit 504 and comprises a line buffer 510, a control unit 512 and a data packing unit 514. The line buffer 510 includes K memory cells divided into a first section and a second section, wherein K>1 and the number of memory cells in the first section is greater than the number of memory cells in the second section. The control unit 512 is coupled to the line buffer 510 and is utilized for writing former N pixel data $P_1$-$P_N$ into the first section and writing latter N pixel data $P_{N+1}$-$P_{2N}$ into the second section, wherein N>1 and the 2N pixel data $P_1$-$P_{2N}$ corresponds to a row of a frame. The data packing unit 514 is coupled to the control unit 512 and is utilized for reading the 2N pixel data in the K memory cells according to an order, and outputting the 2N pixel data $P_1$-$P_{2N}$ to the data-line-signal output circuit 502.

Please note that, the number of the pixel data $P_1$-$P_N$ is equal to the number of the pixel data $P_{N+1}$-$P_{2N}$, and the number of memory cells in the second section is less than the number of memory cells in the first section, so that the memory cells in the second section are used for being written and read at least twice for outputting the pixel data $P_{N+1}$-$P_{2N}$. Preferably, the number of memory cells in the first section is twice the number of memory cells in the second section. The detailed operations of the timing controller 506 are described in the process 30 shown in FIG. 3 and are not given here. As a result, the timing controller 506 writes the 2N pixel data corresponding to a row of a frame into 3N/4 memory cells and reads the 2N pixel data according to the order. Compared with the prior art line buffer, the line buffer 510 saves ¼ number of memory cells.

In conclusion, the embodiment of the present invention divides the latter half of the 2N pixel data corresponding to a row of a frame into two equal portions, and performs writing and reading actions of the latter half of the 2N pixel data in the second section of memory cells. Therefore, the embodiment of the present invention uses 3N/4 memory cells for writing and reading the 2N pixel data, which is more efficient than the prior art using N memory cells, so as to save memory cost for displaying images.

Those skilled in the art will readily observe that numerous modifications and alterations of the device and method may be made while retaining the teachings of the invention.

What is claimed is:

1. A data access method for a timing controller of a flat panel display comprising:

forming a line buffer including a plurality of memory cells in the timing controller;

dividing the plurality of memory cells into a first section and a second section, wherein the number of memory cells in the first section is greater than the number of memory cells in the second section;

writing a first number of pixel data into the first section, wherein the first number of pixel data is included in a plurality of pixel data corresponding to a row of a frame;

performing at least two times of different writing and reading processes on each of at least one memory cell of the second section to write different pixel data in the different writing and reading processes, respectively, thereby writing a second number of pixel data into the second section, wherein the second number of pixel data is included in the plurality of pixel data corresponding to the row of the frame, and the first number is equal to the second number; and reading the plurality of pixel data from the plurality of memory cells according to an order.

2. The data access method of claim 1, wherein the number of memory cells in the first section is twice the number of memory cells in the second section.

3. The data access method of claim 1, wherein the first number of pixel data corresponds to a former half of the row of the frame and the second number of pixel data corresponds to a latter half of the row of the frame.

4. The data access method of claim 1, wherein the step of writing the first number of pixel data into the first section comprises writing every pair of the first number of pixel data into a corresponding memory cell in the first section.

5. The data access method of claim 1, wherein the step of performing the at least two times of the different writing and reading processes on each of at least one memory cell of the second section to write different pixel data in the different writing and reading processes, respectively, thereby writing the second number of pixel data into the second section comprises:

dividing the second number into a third number and a fourth number, wherein the third number is equal to the fourth number writing every pair of the third number of pixel data into a corresponding memory cell in the second section;

reading every pair of the third number of pixel data from the corresponding memory cell in the second section;

writing every pair of the fourth number of pixel data into a corresponding memory cell in the second section;

reading every pair of the fourth number of pixel data into a corresponding memory cell in the second section;

wherein the third number of pixel data has been written into and read out ahead on the corresponding memory cell in the second section before each of the fourth number of pixel data is written into the same memory cell in the second section.

6. The data access method of claim 5, wherein the step of writing every pair of the fourth number of pixel data into a corresponding memory cell in the second section comprises after every pair of the third number of pixel data has been and read out from the corresponding memory cell in the second section, every pair of the fourth number of pixel data is then written into the same memory cell in the second section.

7. A flat panel display for saving memory cells for displaying images comprising:

a panel;

a data-line-signal output circuit coupled to the panel, for outputting pixel data of the images;

a scan-line-signal output circuit coupled to the panel, for driving the panel to display the images; and a timing controller coupled to the data-line-signal output circuit and the scan-line-signal output circuit, the timing controller comprising:

a line buffer including a plurality of memory cells, wherein the plurality of memory cells is divided into a first section and a second section, and the number of memory cells in the first section is greater than the number of memory cells in the second section;

a control unit coupled to the line buffer, for writing a first number of pixel data into the first section and performing at least two times of different writing and reading processes on each of at least one memory cell of the second section to write different pixel data in the different writing and reading processes, respectively, thereby writing a second number of pixel data into the second section, wherein the first number of pixel data and the second number of pixel data are included in a plurality of pixel data corresponding to a row of a frame and the first number is equal to the second number; and a data packing unit coupled to the control unit, for reading the plurality of pixel data from the plurality of memory cells according to an order and outputting the plurality of pixel data to the data-line-signal output circuit.

8. The flat panel display of claim 7, wherein the number of memory cells in the first section is twice the number of memory cells in the second section.

9. The flat panel display of claim 7, wherein the first number of pixel data corresponds to a former half of the row of the frame and the second number of pixel data corresponds to a latter half of the row of the frame.

10. The flat panel display of claim 7, wherein the control unit is further utilized for writing every pair of the first number of pixel data into a corresponding memory cell in the first section.

11. The flat panel display of claim 7, wherein the control unit is further utilized for dividing the second number into a third number and a fourth number, wherein the third number is equal to the fourth number.

12. The flat panel display of claim 11, wherein the control unit is further utilized for writing every pair of the third number of pixel data into a corresponding memory cell in the second section, reading every pair of the third number of pixel data from the corresponding memory cell in the second section, writing every pair of the fourth number of pixel data into a corresponding memory cell in the second section, reading every pair of the fourth number of pixel data into a corresponding memory cell in the second section, wherein the third number of pixel data has been written into and read out ahead on the corresponding memory cell in the second section before each of the fourth number of pixel data is written into the same memory cell in the second section.

13. The flat panel display of claim 12, wherein after every pair of the third number of pixel data has been and read out from the corresponding memory cell in the second section, every pair of the fourth number of pixel data is then written into the same memory cell in the second section.

* * * * *